(12) United States Patent
Paskins

(10) Patent No.: US 6,516,465 B1
(45) Date of Patent: Feb. 4, 2003

(54) DIGITAL VIDEO RECEIVER, A CONDITIONAL ACCESS MODULE AND A METHOD OF TRANSMITTING DATA THEREBETWEEN

(75) Inventor: Adrian Charles Paskins, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 09/206,610

(22) Filed: Dec. 7, 1998

(30) Foreign Application Priority Data

Dec. 9, 1997 (GB) .............................................. 9726049

(51) Int. Cl.$^7$ ............................. H04N 7/10; H04J 13/04
(52) U.S. Cl. ........................ 725/25; 725/131; 380/217; 348/461; 348/473
(58) Field of Search .............................. 348/12, 13, 10, 348/7, 6, 460–468, 473, 553; 455/5.1, 6.1, 6.2; 709/217; 725/68–73, 131–142, 151–153, 25–31; 380/210–242

(56) References Cited

U.S. PATENT DOCUMENTS

| 5,517,502 A | | 5/1996 | Bestler et al. | |
|---|---|---|---|---|
| 5,574,965 A | * | 11/1996 | Welmer ........................ | 455/3.2 |
| 5,771,064 A | * | 6/1998 | Lett ............................. | 725/134 |
| 5,796,829 A | * | 8/1998 | Newby et al. ................. | 380/21 |
| 5,926,230 A | * | 7/1999 | Niijima et al. ............... | 348/564 |
| 5,933,192 A | * | 8/1999 | Crosby ......................... | 725/71 |
| 5,936,660 A | * | 8/1999 | Gurantz ........................ | 725/71 |
| 6,005,855 A | * | 12/1999 | Zehavi et al. ................ | 370/335 |
| 6,075,570 A | * | 1/2000 | Usui et al. .................... | 348/569 |
| 6,026,098 A | * | 2/2000 | Kamoi et al. ................ | 370/539 |
| 6,040,851 A | * | 3/2000 | Cheng et al. ................ | 725/132 |
| 6,148,347 A | * | 11/2000 | Finch ........................... | 710/14 |
| 6,292,858 B1 | * | 9/2001 | Inkinen et al. .............. | 710/102 |
| 6,347,399 B1 | * | 2/2002 | Paskins ........................ | 725/25 |

FOREIGN PATENT DOCUMENTS

| EP | 0 535 890 | 4/1993 |
|---|---|---|
| EP | 0 535 890 A2 | 4/1993 |

* cited by examiner

Primary Examiner—Bhavesh Mehta
Assistant Examiner—Reuben M. Brown
(74) Attorney, Agent, or Firm—Frommer Lawrence & Haug LLP; William S. Frommer; Bruno Polito

(57) ABSTRACT

A digital video receiver, a conditional access module and method of transmitting data therebetween, the digital video receiver having a multi line socket for connection to the conditional access module, the socket having a pre-determined plurality of lines for transmitting and receiving transport stream data and a pre-determined plurality of lines for transmitting and receiving control data and resource/application data, the method comprising selectively transmitting resource/application data over the plurality of transport stream lines.

11 Claims, 6 Drawing Sheets

TRANSPORT STREAM
PROCESSING
DEVICE (TSP#1)

TRANSPORT STREAM
PROCESSING
DEVICE (TSP#2)

DIGITAL VIDEO RECEIVER, A CONDITIONAL ACCESS MODULE AND A METHOD OF TRANSMITTING DATA THEREBETWEEN

BACKGROUND OF THE INVENTION

1. Field of the Invention

The present invention relates to a digital video receiver, a conditional access module and a method of transferring data therebetween. In particular, it relates to systems allowing higher rates of flow for the control data.

2. Description of the Related Art

As illustrated in FIG. 1 of the accompanying drawings, it has been proposed to provide a digital video broadcasting (DVB) receiver 2 in conjunction with a conditional access sub-system (CASS) 4. The CASS module 4 controls access to a broadcast service, for instance by descrambling a transmitted broadcast. The CASS module 4 may also hold service entitlement information, controlled by the service provider. The service provider may communicate with the CASS module 4 using encrypted messages carrying descrambler keys and service management information.

In order for the CASS module 4 to descramble a transport stream, such as an MPEG transport stream, received by the DVB receiver 2, an interface is provided between the DVB receiver and the CASS module. The interface has a plurality of lines 6 allowing the transport stream to be sent to the CASS module 4 and a plurality of lines 8 allowing the transport stream to be sent back to the DVB receiver 2.

As illustrated, it, is also proposed that a command interface 10 should be provided between the DVB receiver 2 and CASS module 4. The command interface 10 allows communication between the DVB receiver 2 and CASS module 4 with regard to functioning of the DVB receiver 2 and CASS module 4.

The command interface 10 is preferably a polled (with an option for interrupts) byte wide connection. The DVB receiver 2 detects if the module 4 has data to send and then reads it back a byte at a time from the module 4 and, if the DVB receiver 2 has data to send, it checks that its buffer is free and then sends the data a byte at a time to the module 4.

Thus, the interface operates by sending packets of a fixed maximum size across the interface 10. The maximum size of these packets is governed by the buffer size of the DVB receiver 2 or module 4, the DVB receiver 2 reading the module buffer size as part of the interface initialization.

Thus, the maximum bit rate capacity of the command interface 10 is relatively small.

It is proposed that the CASS module 4 could be used for functions other than merely descrambling the transport stream. For example, the CASS module 4 could be used in an interactive way, communicating with the remote control of the DVB receiver 2, communicating with a modem in the DVB receiver 2 or producing relatively complicated graphics for display on the television screen. For these functions, the command interface data rates impose a limitation, for instance creating undesirable delays in operation and jerky movement on screen.

OBJECTS AND SUMMARY OF THE INVENTION

It is an object of the present invention at least to educe these problems.

According to the present invention, there is provided a method of operating a digital video receiver having a multi line socket for connection to a conditional access module, the socket having a predetermined plurality of lines for transmitting and receiving transport stream data and a predetermined plurality of lines for transmitting and receiving control data and resource/application data, the method comprising:

selectively transmitting resource/application data over the plurality of transport stream lines.

There is also provided a digital video receiver including:

a multi line socket for connection to a conditional access module, the socket having a predetermined plurality of lines for transmitting and receiving transport stream data and a predetermined plurality of command lines for transmitting and receiving control data and resource/application data, wherein the receiver is arranged to selectively transmit and receive resource/application data over the plurality of transport stream lines.

There is also provided a conditional access module for connection to a multi line socket of a digital video receiver, the module including:

a predetermined plurality of lines for transmitting and receiving transport stream data to and from corresponding lines of the socket; and a predetermined plurality of command lines for transmitting and receiving control data and resource/application data to and from corresponding lines of the socket; wherein the module includes means to selectively transmit and receive resource/application data over the plurality of transport stream lines.

The routing of resource/application data over the transport stream line may be selected on the basis of one or more of a number of a number of factors.

The receiver or conditional access device may have means to selectively transmit and receive resource/application data over the transport stream lines when the conditional access module is not required to process transport stream data.

In this way, when the conditional access module is not processing the transport stream and the transport stream would otherwise be merely passing through the conditional access module, the transport stream lines can be used for the resource/application data.

The receiver or conditional access module may also selectively transmit and receive resource/application data over the transport stream lines when the required data rate for the resource/application data exceeds the capacity of the command lines.

In this way, when an application or resource is being used which requires very high data rates, the transport stream lines may be used to allow full operation of that application/resource.

The receiver or conditional access module may also include means to selectively transmit and receive resource/application data in virtual channels of the transport stream which are not being processed by the conditional access module.

This is particularly useful where the conditional access module is only being used to process some of the time multiplexed virtual channels being transmitted as the transport stream over the transport stream lines. The conditional access module is still able to process the required virtual channels of the transport stream, but is able to take advantage of the present invention to transmit resource/application data of high data rate resources/applications in the remaining virtual channels over the transport stream lines.

Preferably, the receiver comprises means for rerouting transport stream data past the conditional access module when resource/application data is being transmitted over the transport lines.

The re-routing of data can be controlled in a number of ways. For instance, the user could merely control the receiver to use the transport stream lines for resource/application data, use of the transport lines might be chosen by the receiver automatically depending on its current load of operation or, where individual virtual channels are used selectively for resource/application data, the re-routing may be switched on the basis of the timing and usage of the multiplexed virtual channels of the transport stream.

Preferably to reduce the work load of the micro processor or resource manager in the receiver, the receiver further comprises means to route resource/application data received over the transport stream lines direct to the appropriate resource without intervention by the resource manager.

Preferably the digital video receiver is a DVB receiver, in which case the transport stream might be broadcast transport stream. However, the present invention can also be used in other systems with broadband inputs, for instance receiving high bandwidth transfer from sources such as an internet connection or a storage device such as DVD or DVCR.

DETAILED DESCRIPTION OF THE PREFERRED EMBODIMENTS

Specific embodiments of the invention will be described by way of example with reference to the accompanying drawings.

The following description concerns broadcast reception. However, it should be understood that it is equally applicable to any broadband transport stream reception or input.

It is proposed to provide a digital video receiver; such as a digital video broadcasting (DVB) receiver 2 in conjunction with a conditional access sub-system (CASS) module 4.

The DVB receiver 2 receives and demodulates a transport stream including a number of virtual channels corresponding to broadcasting stations. Particular broadcasting channels or specific programmes within those channels may be scrambled so as to allow access only by authorised users.

The CASS module 4 may control access to a broadcast service, usually by descrambling a transmitted broadcast. The CASS module 4 may hold service entitlement information, controlled by the service provider and the service provider may communicate with the CASS module using encrypted messages carrying descrambler keys and service management information.

The CASS module 4 is connected to the DVB receiver 2 by means of an interface 6, 8, 10.

Figure 1:
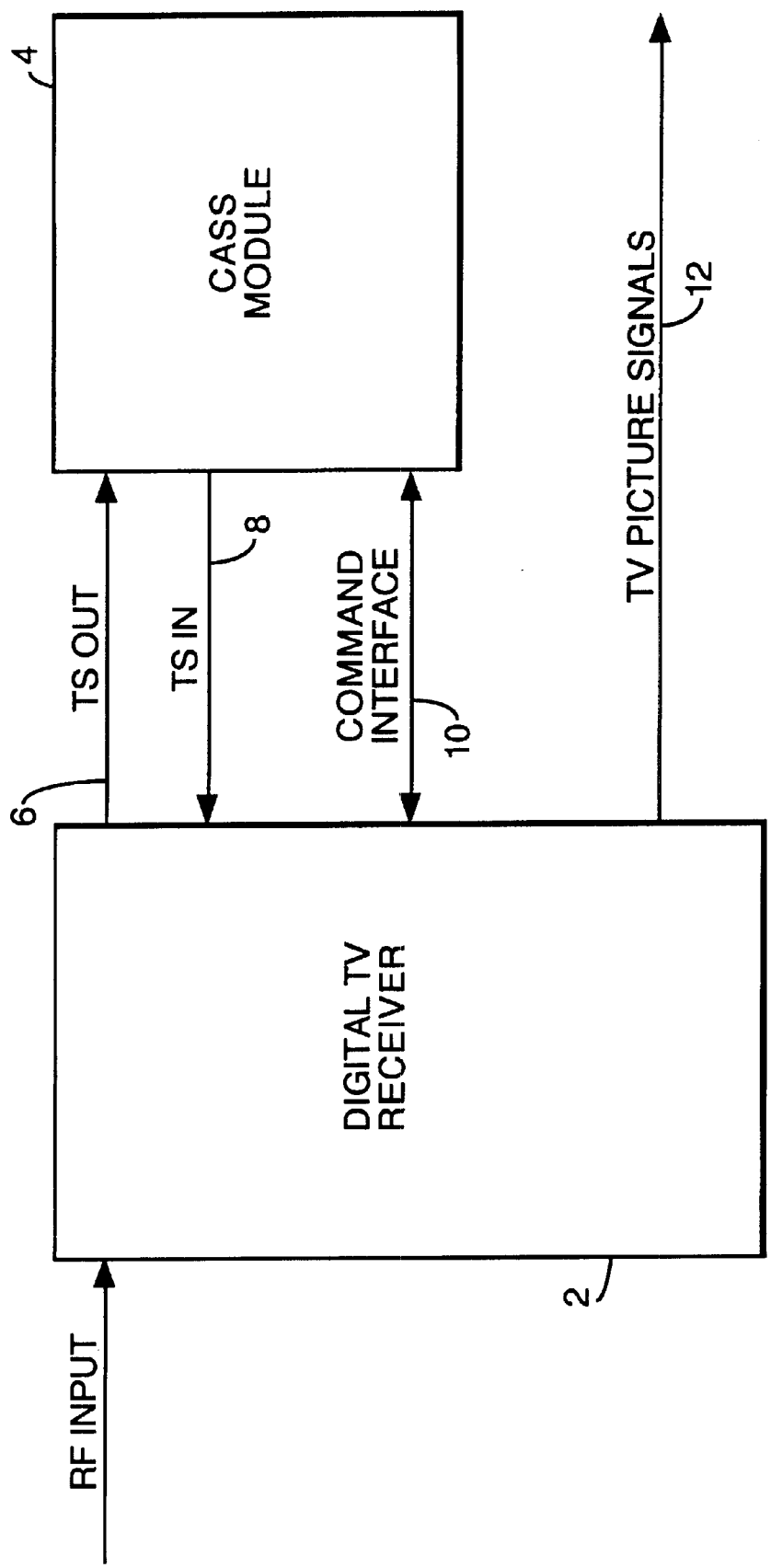
FIG. 1 illustrates a DVB receiver with a CASS module.

FIG. 1 illustrates the arrangement between a DVB receiver 2 and a CASS module 4. In particular, the DVB receiver 2 receives and demodulates a transport stream and sends this over transport stream lines 6 to the CASS module 4. If the CASS module 4 is intended for any of the virtual channels of the transport stream, then it processes these virtual channels accordingly. Usually, this would involve descrambling the transmitted data. The CASS module 4 then returns the transport stream to the DVB receiver 2 over transport stream lines 8 with the appropriately processed virtual channels.

In order to allow control communication between the DVB receiver 2 and CASS module 4, a command interface is also provided with control lines 10.

The DVB receiver 2 processes the returned transport stream with an internal video/audio decoder. According to a selection made by the user, it selects the required data from the transport stream, for instance from a particular virtual channel, and outputs, the required audio and video signals to a television monitor on lines 12.

Preferably, the CASS module 4 is provided as a separate exchangeable component. In this case, it is proposed that the interface between the DVB receiver 2 and CASS module 4 has a PC-card physical construction, for instance as defined by the PCMCIA (personal computer memory card industry association). The interface would be mechanically identical and electrically similar to a standard PC-card interface. However, the interface would re-define several pins/lines in order to provide byte wide MPEG transport stream input and output lines 6,8. The command interface lines 10 would then be provided on remaining pins.

It should be noted that, since the DVB interface will accept a standard PC-card, the DVB receiver should present a standard PC-card interface to any newly inserted card and only switch to the format of the DVB interface once it has been determined that the inserted card is a DVB Common Interface compatible CASS module 4.

Within the system made up of the DVB receiver 2 and the CASS module 4 are what are known as applications and resources. These can reside in the DVB receiver 2 or CASS module 4. The following description relates to the case where the resources all reside on the side of the DVB receiver 2.

Figure 2:
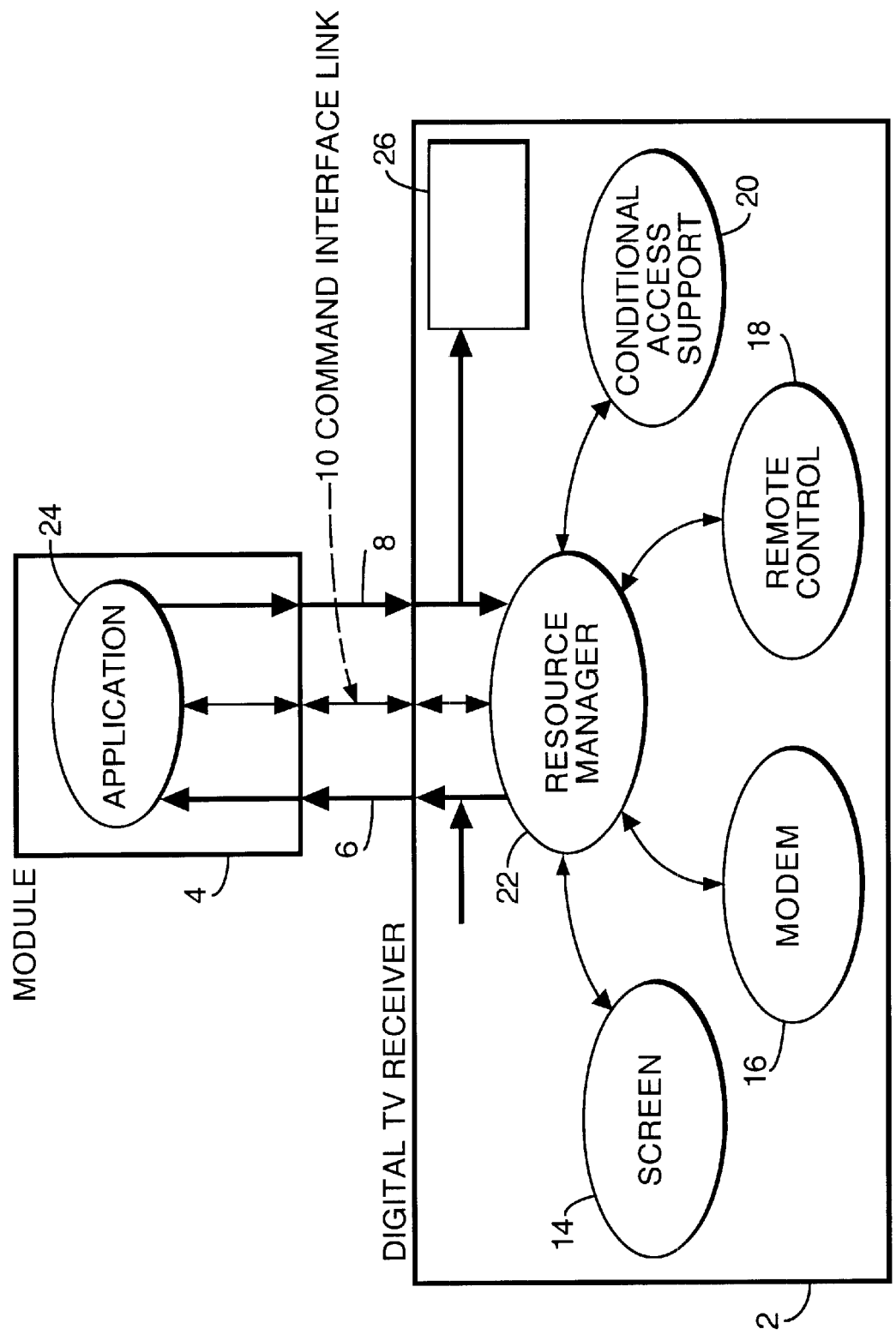
FIG. 2 illustrates schematically the provision of resources in a digital video receiver in conjunction with a CASS module.

As illustrated in FIG. 2, resources may include a screen 14 for displaying a message or graphics (as well as the TV images), a modem 16 for communicating over a return channel, for instance for use in interactive applications, a remote control for controlling functions of the system and other conditional access support 20. Of course, in practice, the resources in the receiver 2 itself may merely comprise drivers/recovers for these devices.

An application 24 accesses resources by opening a session to the resource and then all communication with that resource is carried out over that session, with application/resource data being sent between the application and resource.

Applications can be for a wide range of tasks. For instance, an application is envisaged for conditional access that would handle program entitlements and communicate with the user to handle pay-per-view or subscription requests. In particular, a CASS module 4 might receive codes to indicate that a further subscription fee is due. The application in the CASS module 4 could then open a session to the screen resource 14 to display a message indicating that a subscription fee is due. The user could then use the remote control resource 18 to communicate with the application in the CASS module 4, indicating a desire to renew the subscription and entering credit card details. The application in the CASS module 4 could then access the modem resource 16 to send subscription and credit card details to the service provider. A similar operation could be used to enable payment for a particular pay-per-view programme.

In another application, the CASS module 4 might control the screen resource 14 to display relatively complicated graphics for an interactive game controlled by the remote control resource 18.

As was mentioned above, with the PC card implementation of the physical layer, the command interface 10 is a polled (with an option for interrupts) byte wide connection. The host processor of the DVB receiver 2 controls the low-level physical layer of the command interface. The host detects if the module 4 has data to send and then reads it back a byte at a time from the module 4, if the host has data to send it checks the host buffer is free and then sends the data a byte at a time to the module 4.

The lowest layer of the interface—the link layer— operates by sending packets of a fixed maximum size across the interface. The maximum size of these packets is governed by the buffer size of the host or module. The host reads the module buffer size as part of the interface initialisation. The module can have a minimum buffer size of 16 bytes and the host a minimum buffer size of 256 bytes. The maximum size of buffer for both the host and module is 65536 bytes. The maximum bit rate capacity of this implementation of the command interface is determined by the buffer size (of the host or module whichever is the smaller) and the polling rate.

Thus, the command interface bit rate capacity depends on the minimum buffer size of the host and module and the physical layer polling interval used by the host. Taking the minimum host buffer size of 256 bytes and a suggested reasonable polling interval of 10 ms gives a bit rate of:—

$$1/10 \text{ ms} \times 256 \times 8 = 204.8 \text{ kbit/s}$$

If separate buffers are used for each direction then this bit rate is for each direction simultaneously.

This bit rate is adequate for the applications initially envisaged for the interface—a simple conditional access module. Indeed, the command interface can be used for transmitting the application/resource data discussed above. However, the limited bus rate of the command interface can pose a problem for advanced applications.

Applications are envisaged that would access the screen of the DVB receiver 2 for user interaction. As with other systems, the graphics presentation would be expected to be of a reasonable quality in terms of resolution, colour and speed. Achieving this quality with the graphics being driven over the command interface with a bit-rate limited to 204.8 kbits/s might prove difficult.

Increasing the buffer size of the receiver 2 and module 4 could make a possible improvement to the bit rate capacity. This would increase the bit rate capacity of the interface 10, but other factors need to be taken-into account. The DVB receiver 2 is a real time system with many software tasks as well as the interface. These tasks need to be executed regularly and therefore task scheduling is required.

To service the interface at full capacity with a 256 byte buffer size requires 256 accesses. These accesses will take around 100 ns each, giving a total access time of 25.6 µs. To this time also needs to be added the access instruction cycles which will be dependent on the microprocessor used in the host receiver 2. Using DMA (direct memory access) techniques, it is possible to remove access instruction cycles from the calculation. However, the access cycles will still use up processing time.

The command interface 10 could also be loaded by other traffic, from other applications using other resources. In particular, an application using the command interface 10 heavily could adversely affect the performance perceived by the user of other applications. Conversely, the heavy user application could have its performance impaired by the traffic of the other applications.

As discussed above, the interface between the DVB receiver 2 and CASS module 4 has two parts, namely the transport stream lines 6, 8 and the command interface control lines 10. The transport stream lines 6, 8 allow for two transport streams operating at up to 58 Mbit/s each way into and out of the module 4. It is proposed, as part of the present invention, to make use of these lines 6, 8 to carry data to and from resources and applications. In particular, transport streams, such as an MPEG transport stream, can carry application data of a suitable format for a particular resource, without loading the command interface 10 with data.

With reference to FIG. 2, during normal broadcast reception, the broadcast stream is routed via the transport stream lines 6 to the CASS module 4 for appropriate processing and the resulting broadcast transport stream is routed back via transport stream line 8 to the DVB receiver for further processing, such as with the video/audio decoder 26. However, as illustrated in FIG. 2, the resource manager 22 is also connected to the transport stream lines 6 and 8. Therefore, instead of routing the broadcast transport streams over the transport stream lines 6 and 8, the resource/ application data can be routed between the resource manager 22 and application 24 over the transport stream lines 6 and 8.

Of course, if the transport lines 6, 8 are used for transmitting control data between resources and applications, the transport stream carrying video and audio signals for the. receiver will be interrupted. However, this may not be a large problem for two reasons.

Firstly, for applications using such large amounts of data that they require the use of the transport stream lines, for instance for a graphics operation, it is unlikely that it will be necessary to display broadcast signals.

Secondly, it will be appreciated that a broadcast transport stream need only be sent through the CASS module 4 when it requires some processing, such as descrambling. Often, the broadcast signals contained in the transport stream will not require descrambling. In these cases, it would be possible to provide the DVB receiver 2 with an internal architecture which could re-route the broadcast transport stream past the interface and straight onto the video decoder 26 of the DVB receiver 2. In this way, the DVB receiver 2 is still able to display broadcast video images, even though the transport stream lines 6 and 8 are used for resource/ application data between the resources and applications. A suitable switching mechanism is illustrated schematically in FIG. 6.

This switching mechanism operates on transport stream signals and allows a received broadcast stream to be switched out to the CASS module 4 in normal operation.

The switching mechanism also has two additional connections for the resource manager 22. In this way, the switching mechanism can route high bit rate application/ resource data received from the CASS module 4 over the transport stream lines 6, 8 directly to the resource manager 22. The switching mechanism also allows the resource manager 22 to output a data stream over the transport stream lines 6, 8 to the CASS module 4. By use of this switching mechanism, where the CASS module 4 is not required to process a broadcast transport stream, the broadcast transport stream can be routed un-interrupted for processing by the rest of the DVB receiver, for instance on to the decoder 26.

Figure 3:
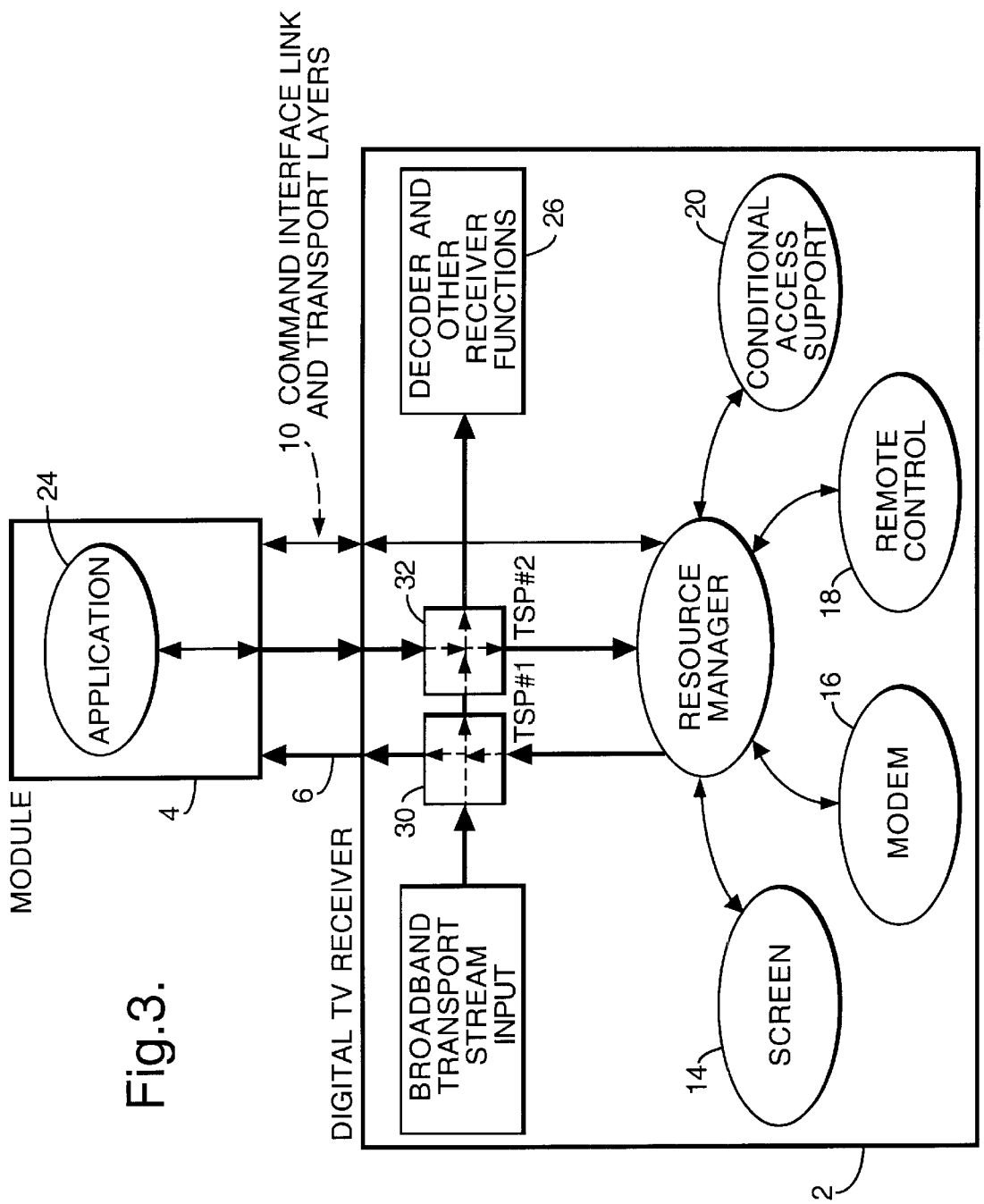
FIG. 3 illustrates a variation to the embodiment of FIG. 2.

FIG. 3 illustrates a variation on the circuit of FIG. 2 in which a switching arrangement is shown in greater detail.

In particular, first and second transport stream processing devices 30,32 are provided respectively for input data from the broadband transport stream input and the resource manager and for output data to the decoder and resource manager.

Figure 7A:
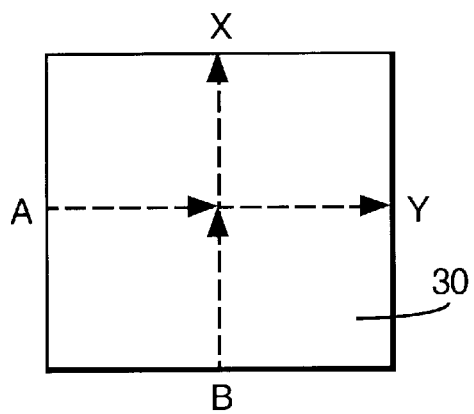
FIGS. 7(a) and (b) illustrate the first and second transport stream processing devices of FIGS. 3 and 5.
Figure 7B:
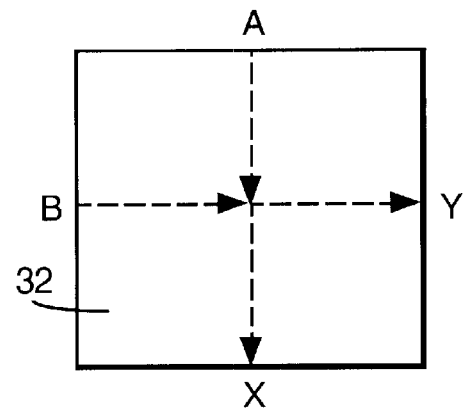

FIG. 7(*a*) illustrates the first transport stream processing device 30. This includes inputs A and B respectively from the broadband transport stream input and the resource manager, an output X to the CASS module and an output Y to the second transport stream processing device 32.

The first transport stream processing device 30 is preferably controlled and configured by the host receiver. It may output at output X data received from either of inputs A and B and may output at output Y transport stream data received from input A. In this way, when the resource manager 22 is sending data on transport stream lines 6 to module 4, the first device 30 can reroute transport stream data on to the second device 32.

FIG. 7(*b*) illustrates the second transport stream processing device 32. This includes inputs A and B respectively from the CASS module and the first transport stream processing device 30, an output X to the resource manager and an output Y to the decoder.

The second transport stream processing device 32 is preferably controlled and configured by the host receiver. It may output at output X data received from input A and may output at output Y, transport stream data received from either of inputs A and B. In this way, when the resource manager 22 is receiving data on the transport stream lines 8 from the module 4, the second device 32 can reroute transport stream data received from the first device 30 to the decoder 26.

Of course, it is only the function of the first and second transport stream devices which is important and they can be configured differently, for instance together as a single unit. Indeed, in practice, it is likely that their functionality would be integrated into the rest of the receiver silicon.

The resource/application control data received by the DVB receiver 2 on the transport stream lines can be transmitted to a resource manager 22 as illustrated in FIGS. 2 and 3. Preferably, the resource manager 22 is able to receive resource/application data for the resources and applications by means of either the command interface 10 or the transport stream lines 6, 8. Thus, during normal television reception, where a low data rate application/resource is being used, appropriate data can be transmitted over the command interface 10 together with broadcast signals over the transport stream lines 6, 8. Where a high data resource/application is used, the resource/application data can instead be transmitted over the transport stream lines 6, 8 to the resource manager 22 and the broadcast transport stream can be re-routed direct to the video decoder 26 without passing through the CASS module 4.

Figure 4:
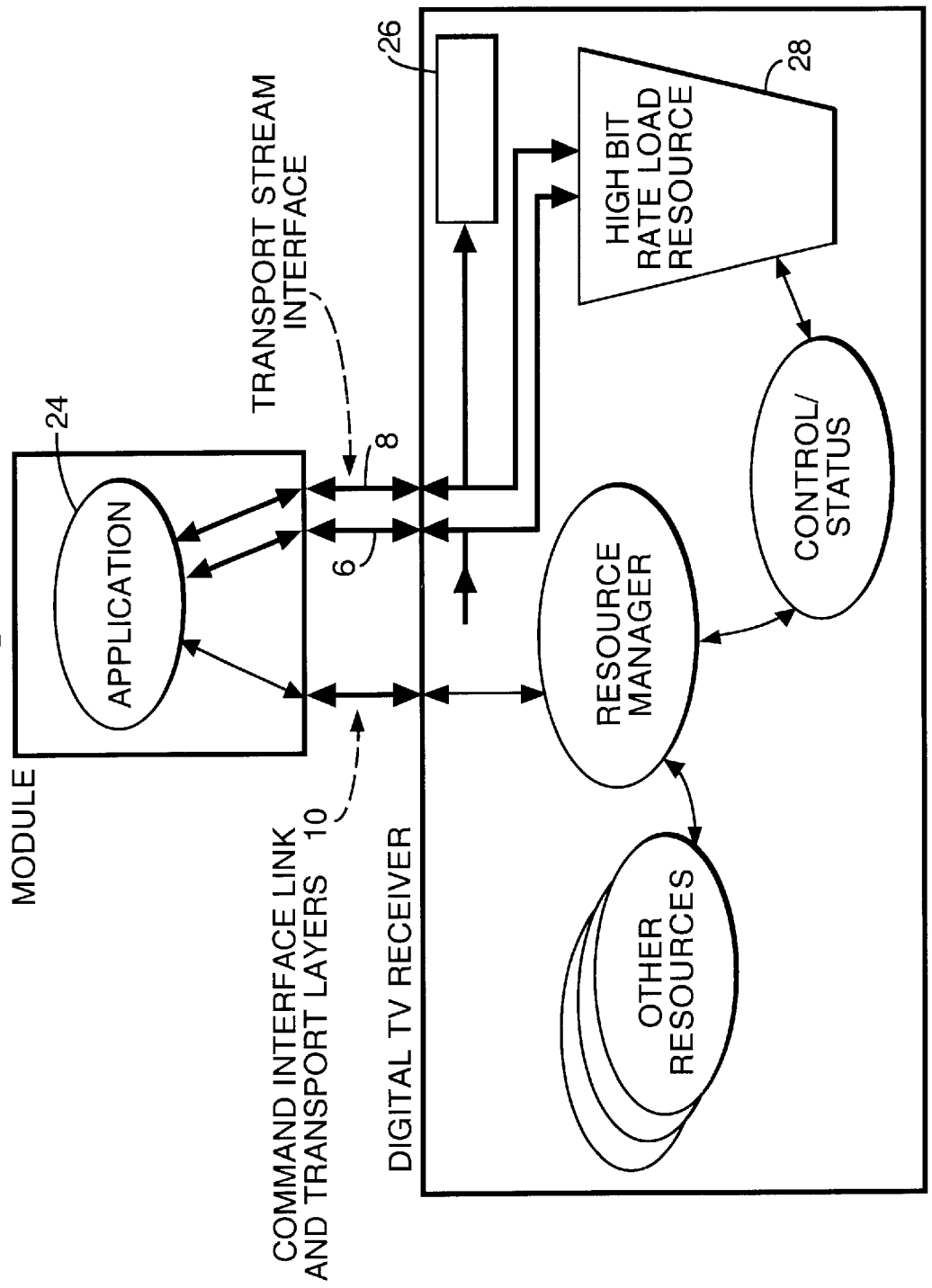
FIG. 4 illustrates schematically direct access to a resource in a digital video receiver.

In some high data rate applications, the resource manager 22 may itself slow down the transfer of data. A disadvantage of resource/application data being handled by the resource manager or CPU either directly or indirectly via a DMA engine is that either the processor is loaded directly or the processor bus bandwidth is taken up. Therefore, as illustrated in FIG. 4, it is proposed that resource/application data received on the transport stream lines could be re-routed direct to the particular high bit rate load resource 28. In particular, an application opens a session to a resource 28 in the normal way. However, the resource 28 is a specially designed resource 24, for instance "transport stream graphics data input". When this resource 28 is opened, the DVB receiver is informed that the application wishes to use the transport stream interface for resource/application data input to a given graphics device i.e. the resource 28. The command interface 10 may be used to handle control and status information, whilst the resource/application data is passed over the transport stream lines 6, 8. For a graphics device resource, the data can be carried in the DSM-CC protocol format. In particular, the DSM-CC protocol is carried in transport stream packets over the DVB Common Interface transport stream interface.

Figure 6:
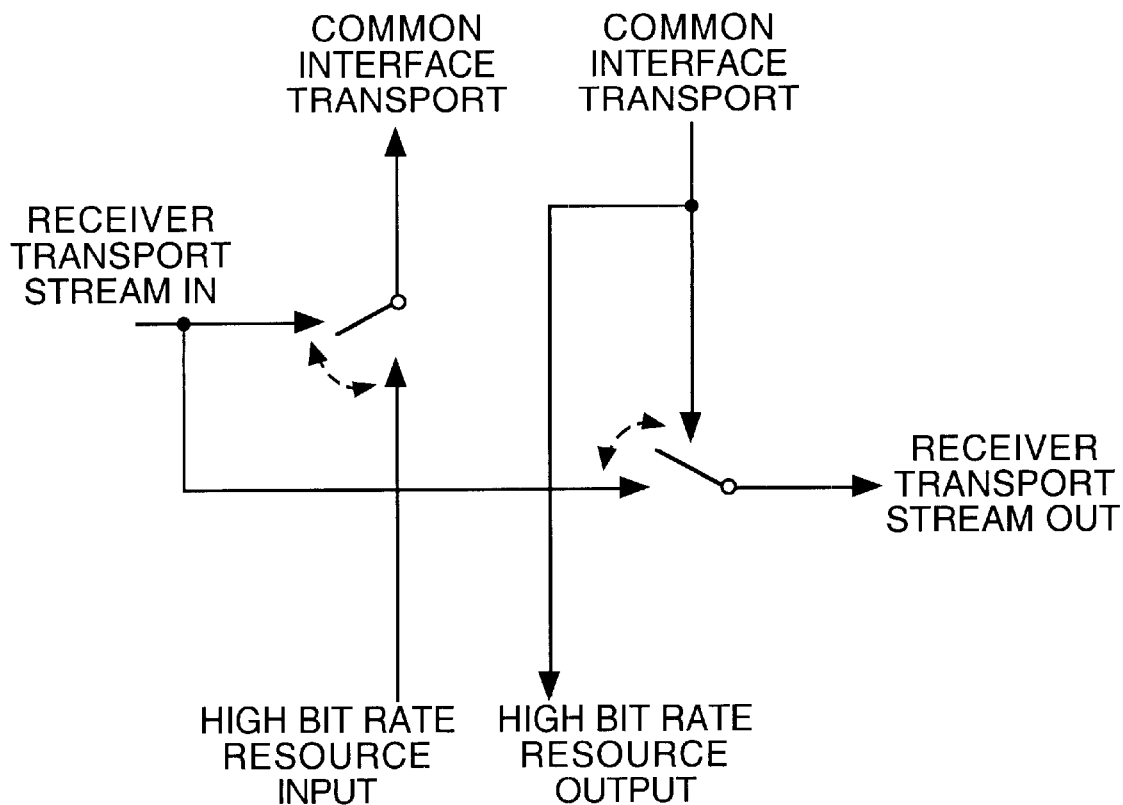
FIG. 6 illustrates a switching arrangement for a system such as illustrated in FIGS. 2 and 4.

As with the embodiment of FIG. 2, the switching arrangement of FIG. 6 may be used to allow broadcast transport streams to be re-routed direct to the decoder 26 whilst the transport stream lines 6, 8 connect an application in this case to the high bit rate load resource 28.

Figure 5:
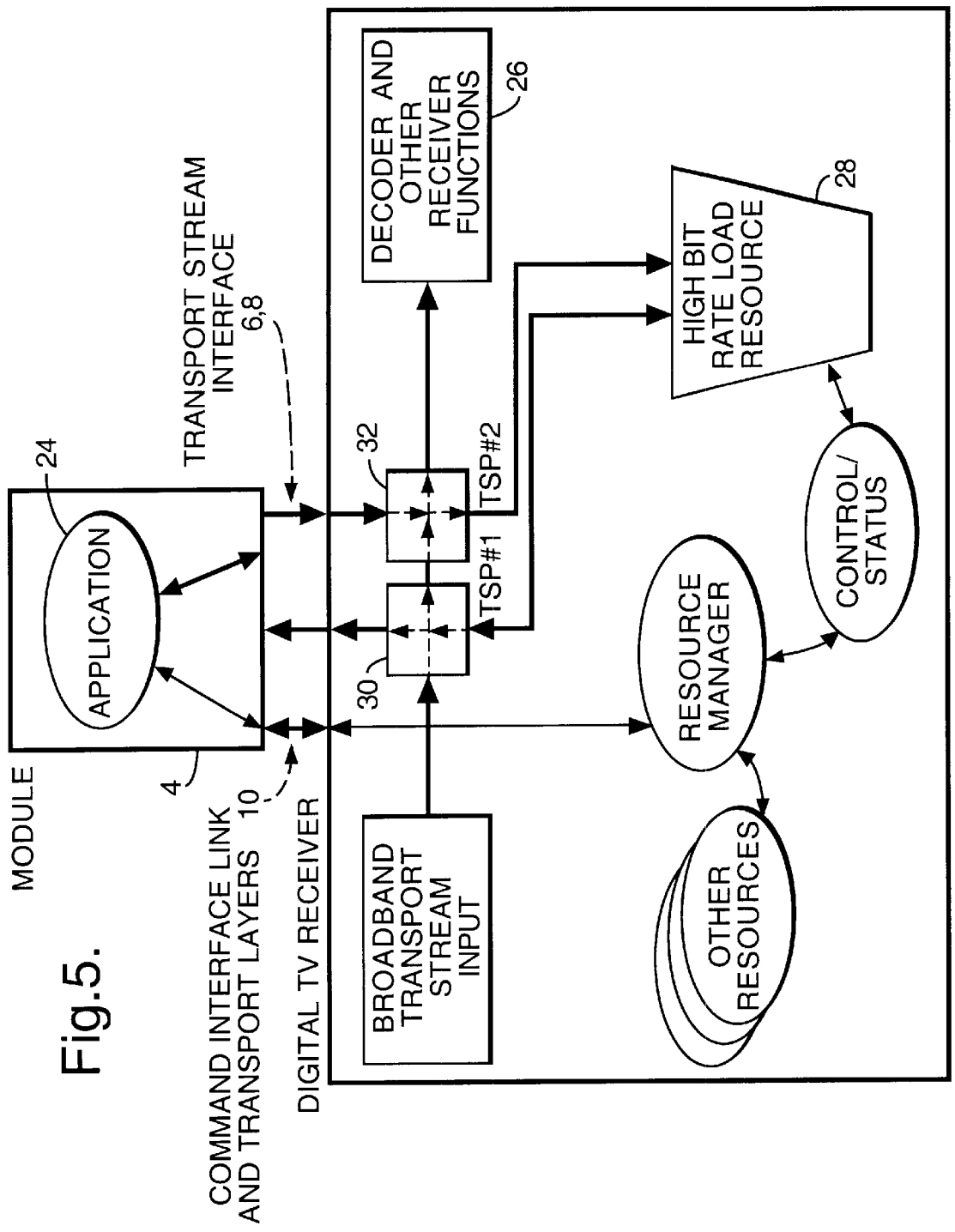
FIG. 5 illustrates a variation to the embodiment of FIG. 4.

Similarly, it is possible to provide first and second transport stream processing devices 30,32 and such an arrangement is illustrated in FIG. 5.

As illustrated, the DVB receiver 2 takes resource/application transport stream data and routes it onwards to the high bit rate resource, such as graphics device, using either dedicated hardware or DMA techniques. A graphics resource could comprise a customised dedicated hardware component or an API into a library of graphics routines held by the host microprocessor of the digital TV receiver.

The above description relates to a system where the transport stream lines 6, 8 are used exclusively for either broadcast signals or resource/application data. However, as is well known, transport streams are often time multiplexed to carry a plurality of virtual channels.

Often, a CASS module 4 will only operate on one or some of those virtual channels. Therefore, it is also possible to implement the present invention by making use of the virtual channels not being processed by the CASS module 4.

It is proposed that the data received over the transport stream lines 6, 8 either by the CASS module 4 or the DVB receiver 2 is first examined to determine whether it relates to broadcast information or resource/application information. In this way, packets relating to broadcast signals can be routed appropriately and packets relating to resource/application information can be routed to the application 24 or the resource, either directly or via the resource manager 22.

It is possible for the first and second transport stream processing devices 30,32 to carry out this operation. Indeed, with this time multiplexing, it is possible that for the first device 30, output X will output a transport stream consisting of packets from both the broadband transport stream input and the resource manager/high bit rate resource and output Y will output only part of the transport stream received from the broadband transport stream.

By using the transport stream lines 6, 8 application data may be transferred at speeds of up to 58 Mbits/s. This rate is higher than the speeds achievable with the command interface 10 and is not limited by the size of the buffer implemented in the DVB receiver 2 or module 4, nor by the polling rates used DVB receiver 2.

The use of the transport stream lines 6, 8 provides dedicated data parts into and out of the DVB receiver 2, whereas the command interface 10 uses the same 8 bit bus for both reading and writing from the CASS module 4.

As explained above, the DVB receiver 2 can provide a dedicated path for resource/application data either through the host microprocessor of the DVB receiver 2 or by using dedicated hardware. This enables the resource/application data to be handled by the DVB receiver 2 without loading the command interface 10 which may be carrying other time critical traffic.

The preferred use of dedicated hardware, avoids the need of the microprocessor of the DVB receiver 2 to handle data at all. Transport stream switches may be used to re-route the transport stream directly to a dedicated hardware port, optionally on a packet by packet basis. This will allow the host microprocessor of the DVB receiver 2 to have more processing power available for other tasks.

I claim:

1. A digital video receiver including:
   a multi line socket for connection to a conditional access module, the socket having a predetermined plurality of lines for transmitting and receiving transport stream data and a predetermined plurality of command lines for transmitting and receiving control data and resource/application data; and
   means for selectively transmitting and receiving resource/application data over the plurality of transport stream lines when the data rate of the resource/application data exceeds the capacity of the command lines;
   whereby data received by the digital video receiver over said transport stream lines is examined to determine whether it is transport stream data or resource/application data and is routed based on the examination results.

2. A receiver according to claim 1 further comprising at least one resource and a resource manager, the resource/application data being for use by the resource and the resource manager being for routing the resource/application data to/from the resource as required.

3. A receiver according to claim 2 further comprising means to route resource/application data received over the transport stream lines direct to the appropriate resource without intervention by the resource manager.

4. A receiver according to claim 1, further comprising means for re-routing transport stream data past the conditional access module when resource/application data is being transmitted over the transport stream lines.

5. A receiver according to claim 4 wherein the re-routing means is controlled on the basis of one or more of a user selection, operation of the receiver and timing and usage of multiplexed virtual channels of the transport stream.

6. A receiver according to claim 1 having means to selectively transmit and receive resource/application data over the transport stream lines when the conditional access module is not required to process transport stream data.

7. A receiver according to claim 1 having means to selectively transmit and receive resource/application data in virtual channels of the transport stream which are not being processed by the conditional access module.

8. A conditional access module for connection to a multi line socket of a digital video receiver, the module including:
   a predetermined plurality of lines for transmitting and receiving transport stream data to and from corresponding lines of the socket;
   a predetermined plurality of command lines for transmitting and receiving control data and resource/application data to and from corresponding lines of the socket; and
   means for selectively transmitting and receiving resource/application data over the plurality of transport stream lines when the data rate of the resource/application data exceeds the capacity of the command lines;
   whereby data received by the digital video receiver over said transport stream lines is examined to determine whether it is transport stream data or resource/application data and is routed based on the examination results.

9. A module according to claim 8 having means to selectively transmit and receive resource/application data over the transport stream lines when the conditional access module is not required to process transport stream data.

10. A module according to claim 8 having means to selectively transmit and receive resource/application data in virtual channels of the transport stream which are not being processed by the conditional access module.

11. A method of operating a digital video receiver having a multi line socket for connection to a conditional access module, the socket having a predetermined plurality of lines for transmitting and receiving transport stream data and a predetermined plurality of command lines for transmitting and receiving control data and resource/application data, the method comprising the step of:
   selectively transmitting resource/application data over the plurality of transport stream lines when the data rate of the resource/application data exceeds the capacity of the command lines;
   whereby data received by the digital video receiver over said transport stream lines is examined to determine whether it is transport stream data or resource/application data and is routed based on the examination results.

* * * * *